United States Patent [19]
Jenks et al.

[11] 4,085,187
[45] Apr. 18, 1978

[54] PROCESS FOR COMPRESSION ROLLING OF POLYMERIC FILMS

[75] Inventors: Richard H. Jenks, Saquoit, N.Y.; Egbert M. Kipp, Devon, Pa.

[73] Assignee: Revere Copper and Brass, Inc., New York, N.Y.

[21] Appl. No.: 684,970

[22] Filed: May 10, 1976

Related U.S. Application Data

[63] Continuation-in-part of Ser. No. 562,651, Mar. 27, 1975, abandoned.

[51] Int. Cl.² .............................................. B29C 15/00
[52] U.S. Cl. .................... 264/280; 264/175; 264/210 R; 264/288
[58] Field of Search ................ 264/175, 210, 280, 288

[56] References Cited
U.S. PATENT DOCUMENTS

| | | | |
|---|---|---|---|
| 2,244,208 | 6/1941 | Miles | 264/175 X |
| 3,083,410 | 4/1963 | McGlamery | 264/280 |
| 3,365,352 | 1/1968 | Burleigh | 264/175 X |
| 3,465,070 | 9/1969 | Smith | 264/175 X |
| 3,470,288 | 9/1969 | Dunnington | 264/288 X |
| 3,504,075 | 3/1970 | Williams | 264/288 X |
| 3,875,284 | 4/1975 | Sasaguri | 264/288 |

*Primary Examiner*—Richard R. Kucia
*Attorney, Agent, or Firm*—Revere Copper and Brass, Inc.

[57] ABSTRACT

Polymer sheet, strip, or film is compression rolled continuously at ambient temperature between rollers under semiboundary or boundary lubrication conditions to effect a single pass reduction in the thickness of the polymer material of from 19/20 to 1/20 of the original thickness. Polymer films formed by this compression rolling process exhibit increased modulus (stiffness), tensile strength, and (in the case of non-opaque materials) enhanced clarity. The circumferential speed of the rollers is maintained essentially equal to the linear speed of the thermoplastic sheet material passing between the rollers and the film rewind tension is maintained in the vicinity of the elastic limit of the material exiting from the rollers.

8 Claims, 3 Drawing Figures

PROCESS FOR COMPRESSION ROLLING OF POLYMERIC FILMS

CROSS-REFERENCE TO RELATED APPLICATION

This is a continuation-in-part of application Ser. No. 562,651 filed Mar. 27, 1975, now abandoned.

BACKGROUND OF THE INVENTION

This invention relates to the formation of films from sheets of polymeric materials. More particularly, it relates to the production of polymer films by the continuous cold rolling of thermoplastic polymer in sheet form.

Films made from polymer materials, and particularly from synthetic organic thermoplastic polymers such as polyethylene and polypropylene, have found widespread utility in such diverse fields as packaging, construction, magnetic tape recording and photography. However, there has been a long-felt need among film processors and users for polymer films having improved physical properties such as strength, stiffness and clarity.

Various methods have been developed in the past for enhancing the physical properties of already-formed (e.g., cast, extruded or skived) films. For example, the film may be bed into a quenching bath immediately after having been formed by melt-extrusion or casting. In addition, films may be stretched in one or more directions or calendered at temperatures above the softening point or range of the polymeric material by means of heated rollers. However, these post-formation procedures for improving the characteristics of polymer films have drawbacks which limit their usefulness in many cases. Thus, stretching methods tend to enlarge any pin holes or voids which may be present in the polymer film as originally prepared, thereby decreasing the moisture-barrier properties of the film and diminishing its usefulness for many packaging purposes. Moreover, calendering often fails to achieve the degree of property enhancement desired, particularly with regard to film clarity and color uniformity.

Another method which has been investigated with a view toward the processing of pre-formed polymer films, and to which the present invention is directed, involves the compression rolling of thermoplastic sheet material which in effect extends and orients the polymer molecules within the latter. Previous efforts toward developing processes for the compression rolling of plastic are described in Williams et al. SPE Journal 17, 42-48 (1971) and in U.S. Pat. Nos. 3,504,075, 3,194,863, 3,083,410, and Re. 27,404. These methods generally involve "full fluid rolling" (i.e., rolling with the use of a layer of lubricant between the film and roller surfaces). In this technique, the surfaces of the plastic sheet material and the rollers at the "nip" (i.e., the point at which compression actually takes place) are separated by the lubricant which forms a "hydrodynamic wedge" between the rollers and the sheet material in front of the nip as the material passes between the rollers.

In hydrodynamic or full fluid lubrication the surfaces in relative motion (i.e., the work roll surfaces and polymeric sheet material) are separated at all times by a continuous uninterrupted fluid lubricant layer so that at no time is there actual physical contact between opposing surfaces. In practice, however, it is often impossible or disadvantageous to maintain a continuous plastic film rolling operation under hydrodynamic lubrication conditions. Thus, hydrodynamic lubrication is limited by the adverse effect of the applied loads or pressures. An increase in the applied load, a frequent requirement for achieving a desired degree of reduction in the polymeric film with resultant improvements in the film clarity and physical properties, requires a compensating increase in the viscosity of the fluid lubricant and/or an increase in the rolling speed. Inasmuch as increments of applied load may require proportionately much larger increases in the fluid viscosity and/or rolling speed, the compression rolling of polymeric films under conditions of hydrodynamic lubrication imposes serious practical limitations in successfully compression rolling under high roll pressures. Thus, increasing the rolling speed causes the generation of unwanted heat as a result of the additional work done on the fluid film. On the other hand, for a given rolling speed and applied load, there is only one optimum value of the lubricant viscosity under hydrodynamic conditions.

Accordingly, it is an object of the present invention to provide an improved process for extending and orienting a preformed polymer sheet by compression rolling.

Another object is to provide an improved process for the compression rolling of cast, extruded, or skived thermoplastic sheet material to effect a reduction in thickness thereof to form a film having improved properties including enhanced strength, stiffness and clarity.

These and other objects of the invention, as well as a fuller understanding of the advantages thereof, can be had by reference to the following detailed description and claims.

SUMMARY OF THE INVENTION

The foregoing objects are achieved according to the present invention by the cold compression rolling (i.e., rolling at ambient temperature) of pre-formed polymer sheet or film material between rollers which exert a pressure on the sheet at the "nip" or roll contact area which is sufficient to effect a substantial reduction, between about 5 and 95 percent, in the thickness of the sheet in a single pass. A fluid can be used in the manner described hereinbelow to facilitate the passage of the sheet between the nip of the rollers. This fluid, which is not a "lubricant" in the normal sense of the word, can be applied to either the polymer sheet material directly or placed on the rollers so as to transfer it to the material as it passes between the rollers, or both.

It is a feature of the present invention that the compression rolling operation is carried out under conditions of lubrication known as semi-boundary (semi-fluid, non-hydrodynamic) and boundary (dry, non-fluid) lubrication. The latter condition includes, as the extreme case, dry rolling. In every form, however, the process of the invention is characterized by actual surface-to-surface contact between the rollers and the plastic sheet material. The primary purpose of any liquid which may be used is to serve either as a coolant and temperature regulator or as a means of establishing and maintaining frictional contact between the film and roll surfaces rather than as a true hydrodyanmic lubricant. The compression rolling of plastics under these conditions of lubrication has been found to eliminate serious disadvantages characteristic of compression rolling under conditions of hydrodynamic lubrication and, additionally, results in important processing benefits.

It is a further feature of the present invention that the "film rewind tension", i.e., the tension which the film rewind rollers exert on the film emerging from the mill or work rolls, is kept as high as possible without exceeding the elastic limit or yield strength of the polymer film. The optimum rewind tension for a particular sample of polymer film can be determined empirically by plotting yield strength versus degree of film thickness reduction. It has been discovered that by operating under the aforesaid rewind tension, an unexpected enhancement in physical properties such as yield strength, resistance to water penetration and film clarity are realized. In this connection, the process of the invention can be conducted at rewind tensions which are slightly below the vicinity of the elastic limit of the film provided that the concomitant loss in the aforesaid properties or the decrease in the degree of film reduction can be tolerated for the particular use for which the film is intended. It is also important to control the adjustment of the film unwind tension concurrent with the rewind tension in order to ensure a proper rate of feed to work rolls.

The work rolls used in the process of the present invention are preferably precision flat profile work rolls (no "crown") and in this regard they differ from conventional metal rolling work rolls which usually have a deliberate convex "crown" wherein the diameter of the roll increases slightly from end-to-center. In some cases, it may be desirable in the practice of the present invention to employ work rolls having a concave crown, wherein the diameter of the roll decreases slightly from end-to-center.

In contrast to the work rolls, the idler rolls are advantageously provided with a very slight convex crown to prevent film wrinkling; the degree of crown depending on the width of the film being rolled. In addition, the idler rolls, with the exception of the rewinds, should have as high a surface finish as possible which has been found to further decrease the tendency of the polymer film to develop wrinkling. One way of achieving a high surface finish on the idler rolls is to apply a coating of fluorinated polymeric olefin (e.g., "Teflon"). An alternative technique suitable for use in the present invention is the use of crowned "herringbone" idlers.

Without wishing to be bound to theory, it is believed that the success of the present invention is due in part at least to the behavior of the polymer film and whatever fluid may be present between the rollers. In this connection, it is helpful to consider the essential nature of the three primary types of lubrication, namely, hydrodynamic, semi-boundary, and boundary lubrication. In so doing, reference is made to FIGS. 1 and 2 of the drawings wherein the qualitative relationships of the major tribological parameters of lubricant viscosity (Z), rolling speed (N) and applied load or pressures between the rollers (P) are shown. FIG. 1 is a plot of the dimensionless parameter, ZN/P, versus the coefficient of friction, $\mu$. FIG. 2 depicts the corresponding variation of ZN/P wiith lubricant film thickness, h. The three factors of ZN/P, coefficient of friction, and lubricant film thickness are related to and determine the three basic types of lubrication, namely, hydrodynamic, semi-boundary, and boundary.

Hydrodynamic lubrication occurs when the values of lubricant viscosity (Z), rolling speed (N), and pressure between the rollers (P) are such as to form a fluid film which generates sufficient pressure to separate the roller surfaces from the surfaces of the sheet of material passing therebetween.

Referring to FIG. 2, it can been seen that hydrodynamic or full fluid lubrication becomes operative when the value of ZN/P is sufficiently large so as to produce a fluid film of maximum thickness. These are also the conditions under which the coefficient of friction is at a minimum value, as shown in FIG. 1. Further increases in the value of ZN/P have no further beneficial effects in terms of increased lubricant film thickness. Instead, the thickness of the lubricant film remains approximately constant while the coefficient of friction continues to increase. Thus, it can be seen that one of the practical disadvantages of compression rolling under conditions of hydrodynamic lubrication is that there is only optimum value of the ZN/P parameter. On the other hand, as the value of ZN/P decreases, the coefficient of friction ($\mu$) is no longer a linear function of ZN/P but rather, begins to increase as the fluid film thickness ($h$) decreases. As ZN/P continues to decrease, we enter into a range in which the lubricating conditions are defined as semi-fluid or semi-boundary lubrication. (See FIG. 1). In this region, lubrication is neither hydrodynamic nor is it boundary lubrication; rather, it involves elements of both types of lubrication. With a still further decrease in ZN/P, the region of boundary lubrication is attained. In this region of lubrication, a continuous fluid film no longer exists. The frictional and load bearing capabilities of the lubricant under conditions of boundary lubrication are now primarily functions of the properties of the solid surfaces involved, including the surfaces of the polymeric films, the work rolls, and the lubricant itself which is interposed between these surfaces.

Thus, it is possible to utilize higher applied work roll loads when rolling under semi-boundary and/or boundary lubrication conditions than is practicable when compression rolling under the hydrodynamic conditions taught in the prior art. In particular, as the ZN/P conditions operative with the use of fluid lubricants approaches the area of semi-boundary lubrication, such lubricants become increasingly ineffective and even inoperative. The only remedy if hydrodynamic lubrication is to prevail is that of increasing the value of ZN/P by increasing the viscosity of the inert fluid, increasing the rolling speeds, and/or by decreasing applied loads on the work rolls. These measures are counter-productive in practice, particularly when it is necessary and desirable to conduct compression rolling under conditions of high work roll loadings, and/or take advantage of heat control properties of low viscosity fluids.

The unique compression rolling technique of the present invention, which is outside the scope of hydrodynamic lubrication, provides substantially increased flexibility in the chioce and application of the operating parameters and in the production of better quality films. A major advantage of the invention is that it permits utilization of some of the beneficial characteristics of hydrodynamic lubrication without the attendant disadvantages, while also providing the superior virtues of semi-boundary and boundary lubrication. In this regard, a salient consideration is that of the desirability of physical contact between the roll surfaces and the polymeric film surfaces, such contact being impossible in hydrodynamic lubrication. The ability to compression roll satisfactorily with solid-to-solid contact between the work rolls and the polymeric film improves the smoothness and related optical properties of the polymeric film surfaces. The flow of the polymeric film between the work rolls is also more effectively controlled in the absence of a hydrodynamic film and in such cases the polymer film surface itself provides the necessary "lubrication".

In this connection, it has been found that the advantages of the invention are only realized when the circumferential speed of the work rolls is essentially equal to the linear speed of the plastic material passing therebetween. More particularly, it is important that the work roll circumferential speed be equal to the entering linear speed of the polymeric sheet material plus an incremental amount resulting from the reduction in gage as the film exits from the work rolls. This is due to the fact that as the polymeric material passes through the "neutral" roll contact area, the speed of the polymeric film exiting from that area will increase by an amount equivalent to the lengthening of the film by virtue of the reduction in film thickness and by an incremental amount due to the phenomenon of forward extrusion. In order to realize this state of affairs, it is necessary to prevent any slippage between the surfaces of the work rolls and polymer film, since work roll speeds which are either excessive or significantly less than the other mill operating parameters, will greatly increase the tendency toward breakage of the polymeric film in the work roll-film contact area. The avoidance of such slippage and the degree of reduction per pass can be enhanced by selecting a work roll surface having a coefficient of friction appropriate to that of the polymer being rolled. Thus, conventional alloy tool steel work roll surfaces can be used to roll plastics of average coefficient of friction; work rolls coated with a low-friction material such as fluorinated polymeric olefin (e.g., "Teflon") can be used for rolling of polymer film having a high coefficient of friction; hard rubber-clad work rolls whose coefficients of friction are relatively high can be advantageously employed to roll more slippery films such as those made from polyolefins. Relatively high coefficient of friction work roll surfaces can also be achieved by the use of highly polished chrome plated, nickel plated or any conventional alloy steel work roll which can take and retain a high polish, the degree of polish required to achieve a desired coefficient of friction being determinable on a case-by-case basis. In addition, so called "non-lubricant" or "anti-lubricant" fluids such as aqueous solutions of inorganic silicates can be used in lieu of increasing the coefficient of friction of the work rolls.

As a desirable option, the film emerging from the work rolls can be subjected to lateral tension, e.g., by use of a "tenter frame", in order to improve the properties of the film in this direction, since the work rolls ordinarily contribute to the properties of the rolled film primarily in the direction in which the film travels. The use of a tenter frame in the practice of the present invention is an attractive feature compared to conventional compression rolling of polymeric materials since a rolled film in which the physical properties are enhanced in the lateral as well as in the direction of rolling has greater applicability in a wider range of uses than a film with only unidirectional improvement in properties.

It is also possible to use the cold compression rolling process of the invention to produce polymeric netting from plastic sheet netting material. An unexpected advantage which is realized through this approach is the superior physical properties of the product, both laterally and transversely, which presumably result from the fact that the elements or "fibers" in the netting are oriented at about a 45° angle to the direction of rolling. Cold compression rolled netting produced according to the present invention is useful, for example, in making sacks for fruits or vegetables.

In rolling pre-formed polymer film to achieve a reduction in thickness according to the present invention, it is desirable to employ a starting polymer material which meets fairly precise control of gage dimensions, both from front-to-back and from side-to-side. In order to realize this, it may be desirable to "pre-condition" the starting film prior to cold compresssion rolling, with a light reduction rolling or conditioning pass using heated rolls such that the polymer, e.g., polyethylene or polypropylene, is subjected to a temperature of between about 150°-250° F. and preferably about 200° F.

The achievement of semi-boundary or boundary lubrication conditions in the cold rolling of plastic sheet material according to the present invention can be achieved in practice by virtue of the fact that the specific nature of the lubricant does not affect the operating characteristics of a full fluid cold rolling process. Only when the conditions of semi-boundary and boundary lubrication are achieved do the properties of the lubricant affect the performance of the operation. Therefore, a change in the composition of the lubricant during a cold rolling process will serve as an indicator of whether or not the process conditions of the present invention have been realized. Thus, the incorporation of so-called "oilyness agents" or "antiwear agents" (e.g., long-chain fatty acid salts) into a lubricant under semi-boundary and boundary lubrication conditions will cause the lubricant's coefficient of friction to drop, thus necessitating a decrease in the film rewind tension. This phenomenon is not observed when operating under conditions of full-fluid lubrication.

The conversion of a given full fluid (hydrodynamic) plastic cold rolling process to the semi-boundary or boundary lubrication method of the invention is conveniently brought about by increasing the unit load on the rollers, decreasing the linear speed of the plastic sheet material through the rollers, decreasing the diameters of the rollers, or increasing the rewind tension on the sheet emerging from between the rollers. Under conditions of boundary lubrication, the surfaces of the work rolls and the rolled plastic film emerging from the roll nip are dry to the touch even when the operation is accompanied by the use of a fluid coolant or "non-lubricant". In contrast, a layer of fluid is clearly discernible to the touch on the aforesaid surfaces when the rolling is conducted under full fluid lubrication.

The use of non-inert fluids and materials which possess desirable properties as lubricants under conditions of semiboundary lubrication is illustrated in FIG. 3 wherein it can be seen that the incorporation of additives such as long chain polar compounds into the fluid permits extension of the effect of hydrodynamic lubrication into the semi-boundary lubrication area even though the film thickness has now become thinner than that associated with full hydrodynamic lubrication.

Examples of non-inert fluids and materials which possess desirable properties as lubricants under conditions of semi-boundary lubrication suitable for use in the present invention are natural fats including vegetable, animal and marine compounds, long chain fatty acids, alcohols, amines, amides, polyethylene glycols, esters of these and of various acids and alcohols, and the like. When used as such, they act as hydrodynamic fluids in the same fashion as any inert fluid of equivalent viscosity properties, but additionally, are effective lubricants under semi-boundary conditions.

In addition to fluid, it has been discovered that certain solids are likewise effective in the compression rolling of polymeric plastic films. In the absence of any other fluid, water can be used in conjunction with these solids for purposes of heat control. Examples of suitable solids found to be useful are polytetrafluorethylene (Teflon), polyamides, polycarbonates, polyacrylates and methacrylates. Solid films of colloidal graphite, colloidal molybdenum sulfide as such or pre-applied to the work roll surfaces with suitable bonding agents are also effective under certain desirable operating conditions. It has been further discovered that the combined use of fluids such as the long chain polar compounds with non-polar fluids is also effective in the practice of the present invention.

DESCRIPTION OF PREFERRED EMBODIMENTS

Figure 1:
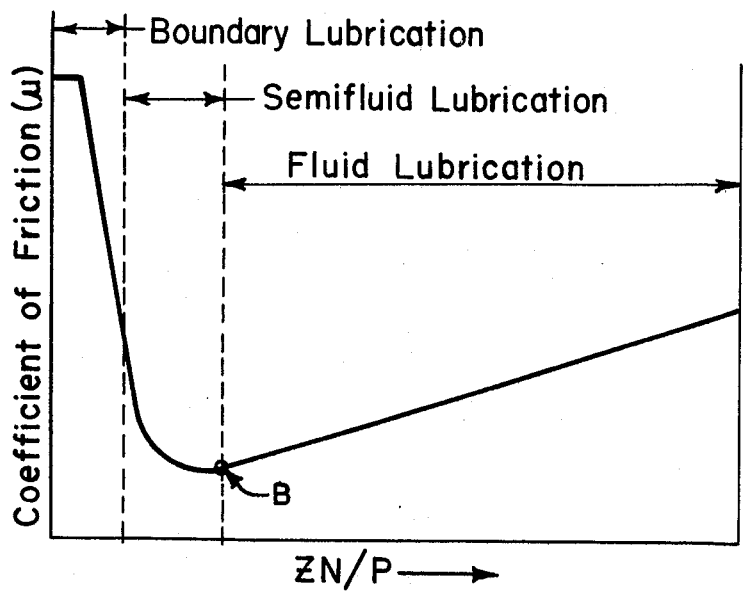
Figure 2:
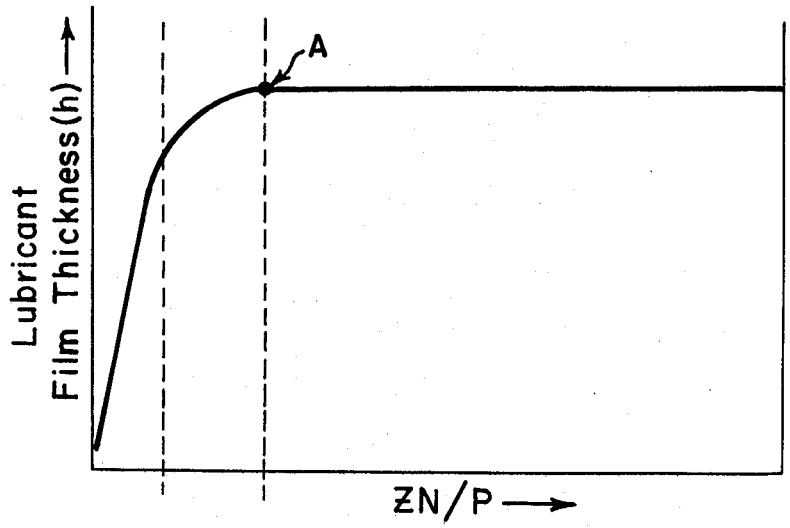
Figure 3:
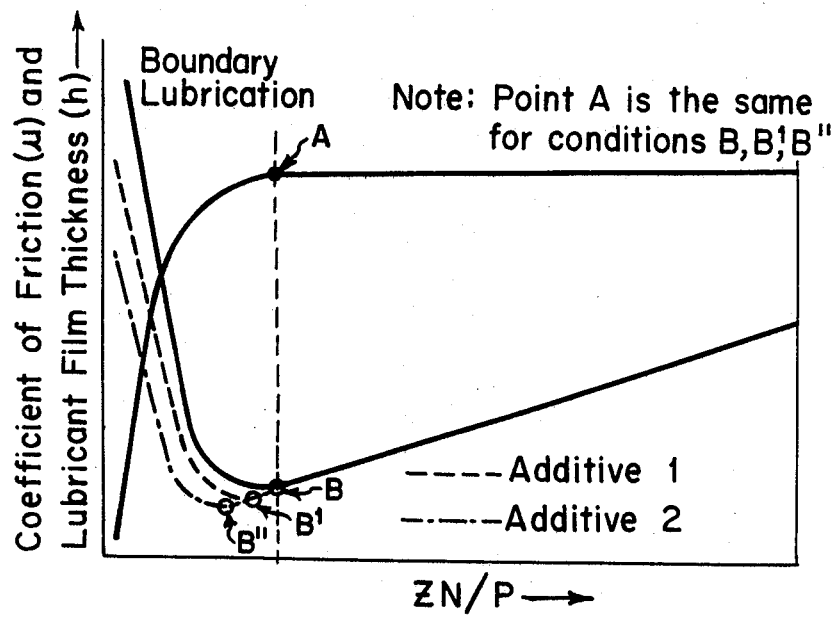

The following examples are intended to illustrate, without limitation, the cold rolling process of the present invention and the advantages thereof.

EXAMPLE I

Compression Rolling: Semi-Boundary Lubrication

A roll of high density polyethylene film (density = 0.9 to 0.99) 23.25 inches wide and 0.016 inch thick is mounted on an unwind spool at the entry side of a 4-hi cold rolling mill. The roll diameters are 9 inches and the face width of each roll is 27 inches. The work rolls are provided with a chrome-nickel alloy finish and have a precision flat profile (no crown). The unwind spool is equipped with a brake or clutch whereby the polymeric film can be fed to the work rolls under a wide range of extensive (as opposed to compressive) stresses across the entire width of the film.

The film is threaded through the work roll and taken up on a rewind spool. The rewind spool is adapted to enable the film winding speed to be varied in relation to the peripheral speed of the work rolls which permits the film exiting from the work rolls to be subjected to a range of uniform extensive stresses across the full width of the film.

The take-up spool is activated and the gears of the work rolls are engaged to a speed of 125 rpm. The polymeric film in the contact areas of the two work rolls is subjected to increasing vertical pressures exerted through the work roll screw-down elements. The unwind and rewind tensions on the film are simultaneously adjusted to produce a compression - rolled polymeric film of the desired thickness having greater flatness (i.e., uniform gauge across the width of the film), optimum clarity and optimum physical properties. The film entering the work rolls is flooded on both the top and bottom sides with water for purposes of cooling.

Under the foregoing conditions, the exit gauge of the film is 0.004 inch, representing a single-pass reduction in gauge of 75 percent (i.e., reduction to 25 percent of the entry gauge).

EXAMPLE II

Compression Rolling: Boundary (Dry) Lubrication

The procedure in the preceding example is repeated except that instead of flood cooling, the work rolls are preconditioned in the following manner.

The work roll surfaces are thoroughly degreased with the aid of an organic solvent such as naphtha, methylethyl ketone, toluene, benzene and the like. The work rolls are then vapor blasted by either conventional wet or dry blasting techniques using as the preferred grit aluminum oxide particles of Tyler mesh size in the 150 to 200 range. The vapor blasting is conducted so as to produce a surface finish in the range of 20 to 30 microinches. Finally, the work roll surfaces are coated with a dispersion of a 1:4 to 4:1 blend of finely divided $MoS_2$ (submicron to not more than 10 micron particle size) and micronized graphite in a phenolic thermoplastic resin binder. This coating is preferably applied by spraying, e.g., with an artist's air brush or commercial spray nozzle in 2 or 3 passes to produce a coating having a uniform thickness of between 0.0002 and 0.0005 inch. The applied coating is then air cured until the surface is dry to the touch or, perferably, by exposure to infrared or other heating means at a temperature of between 200° and 250° F. for a period of time of between 15 and 30 minutes.

The compression rolling is carried out without the use of any flood cooling fluid. The polymer film and/or work roll surfaces are sprayed only as needed with a fine spray of water for the purpose of controlling the heat generated by the friction between the film and the work roll surfaces.

EXAMPLE III

Compression Rolling: Boundary (Dry) Lubrication

The procedure in the preceding example is repeated except that the preconditioning of the work roll surfaces is carried out in the following manner to provide a dry, prelubricated surface on the work rolls.

After degreasing and grit blasting of the work roll surfaces, the latter are sprayed with an extremely find dispersion of TFE fluorocarbon in an inorganic binder and then cured. A suitable commercial formulation is Molykote 523 manufactured by Dow Corning.

The foregoing examples are presented for the purpose of illustrating the process of the present invention. It is understood that changes and variations can be made therein without departing from the scope of the invention as defined in the following claims.

We claim:

1. A process for compression rolling of thermoplastic sheet material comprising:
   (a) passing the material between cylindrical rollers under semi-boundary or boundary lubrication conditions to effect a reduction in the original thickness of the material of between about 5 and 95 percent in a single pass;
   (b) maintaining the circumferential speed of the rollers in step (a) essentially equal to the linear speed of the thermoplastic sheet material passing between said rollers; and
   (c) maintaining the film rewind tension in the vicinity of the elastic limit of the material exiting from the rollers.

2. A process according to claim 1 wherein the thermoplastic sheet material is passed between the cylindrical rollers at ambient temperature and at a film rewind tension which is kept as high as possible without exceeding the elastic limit of the rolled sheet material.

3. A process according to claim 2 wherein the cylindrical rollers have a precision flat profile and the circumferential speed of the rollers is maintained equal to the entering linear speed of the polymeric sheet material plus an incremental amount resulting from the reduction in gage as the film exits from the rollers.

4. A process according to claim 3 wherein the film exiting from the rollers is subjected to tension in a direction perpendicular to the direction in which the film travels.

5. A process according to claim 3 wherein the sheet material is polymeric netting.

6. A process according to claim 3 wherein the sheet material is polyethylene or polypropylene.

7. A process according to claim 1 wherein step (a) is conducted under boundary lubrication conditions.

8. A process according to claim 1 wherein step (a) is conducted under semi-boundary lubrication conditions.

* * * * *

UNITED STATES PATENT AND TRADEMARK OFFICE
CERTIFICATE OF CORRECTION

PATENT NO. : 4,085,187
DATED : April 18, 1978
INVENTOR(S) : Richard H. Jenks and Egbert M. Kipp It is certified that error appears in the above-identified patent and that said Letters Patent are hereby corrected as shown below:

Title page, before "[57] ABSTRACT" and after *"Attorney, Agent or Firm"*, "Revere Copper and Brass, Inc." should read -- Pennie & Edmonds -- .

Column 1, line 27, "bed" should read -- fed -- .

Column 4, line 14, "only optimum" should read -- only one optimum -- .

Column 4, line 53, "chioce" should read -- choice -- .

Column 6, line 31, "boundary and" should read -- boundary or --

Signed and Sealed this

Seventh Day of November 1978

[SEAL]

Attest:

RUTH C. MASON
Attesting Officer

DONALD W. BANNER
Commissioner of Patents and Trademarks